(12) United States Patent
Kaku et al.

(10) Patent No.: US 7,388,058 B2
(45) Date of Patent: Jun. 17, 2008

(54) POLYESTER BLEND COMPOSITIONS AND BIODEGRADABLE FILMS PRODUCED THEREFROM

(75) Inventors: Mureo Kaku, Tochigi (JP); Akiko Mizutani Ushiyama, Tochigi (JP); Richard Allen Hayes, Brentwood, TN (US); Jennifer M. Schneider, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 196 days.

(21) Appl. No.: 10/437,688

(22) Filed: May 12, 2003

(65) Prior Publication Data

US 2003/0220456 A1 Nov. 27, 2003

Related U.S. Application Data

(60) Provisional application No. 60/380,341, filed on May 13, 2002.

(51) Int. Cl.
*B29D 22/02* (2006.01)
*C08L 67/03* (2006.01)

(52) U.S. Cl. ..................... 525/444; 264/573

(58) Field of Classification Search ............... 525/444, 525/437, 439, 410, 411, 415, 535, 537
See application file for complete search history.

(56) References Cited

U.S. PATENT DOCUMENTS

| | | | |
|---|---|---|---|
| 4,161,579 A * | 7/1979 | Edelman et al. | ............. 525/444 |
| 5,053,482 A | 10/1991 | Tietz | |
| 5,076,983 A | 12/1991 | Loomis et al. | |
| 5,091,459 A * | 2/1992 | Howe | ......................... 524/456 |
| 5,097,004 A | 3/1992 | Gallager et al. | |
| 5,097,005 A | 3/1992 | Tietz | |
| 5,219,646 A * | 6/1993 | Gallagher et al. | ........... 442/361 |
| 5,443,780 A | 8/1995 | Matsumoto et al. | |
| 5,889,135 A | 3/1999 | Warzelhan et al. | |
| 6,046,248 A * | 4/2000 | Warzelhan et al. | ........... 521/138 |
| 6,071,984 A | 6/2000 | Grigat et al. | |
| 6,120,895 A * | 9/2000 | Kowitz et al. | ............... 428/364 |
| 6,746,779 B2 * | 6/2004 | Hayes et al. | ................. 428/480 |

FOREIGN PATENT DOCUMENTS

| | | |
|---|---|---|
| DE | 195 35 715 A1 | 6/1997 |
| EP | 1354908 A1 | 10/2003 |
| JP | 54-43017 A * | 4/1979 |
| JP | 57-89955 A * | 6/1982 |
| JP | 58-83046 A * | 5/1983 |
| JP | 59-56424 A * | 3/1984 |
| JP | 6-56979 A * | 3/1994 |
| JP | 7252352 A | 10/1995 |
| JP | 2001 089649 | 4/2001 |
| JP | 2002-88172 A * | 3/2002 |
| WO | WO 93/07213 | 4/1993 |
| WO | WO 95/14740 A1 * | 1/1995 |
| WO | WO 01/10928 A1 | 2/2001 |
| WO | WO 02/16468 A1 | 2/2002 |
| WO | WO 02/44249 A1 | 6/2002 |
| WO | WO 02/059199 A1 | 8/2002 |
| WO | WO 02/072699 A1 | 9/2002 |
| WO | WO 02/078944 A1 | 10/2002 |

OTHER PUBLICATIONS

English Translation of JP 07-252352, Oct. 1995, Watanabe et al. obtained from JPO website.*
English Translation of JP 2001-089649, Apr. 2001, Sugimoto et al. obtained from JPO website.*
PCT International Search Report for International application No. PCT/US 03/15029, dated Aug. 22, 2003.

* cited by examiner

*Primary Examiner*—Robert Sellers

(57) ABSTRACT

A polyester blend composition that comprises at least two copolymers selected from certain copolymers, particularly blends of branched and linear biodegradable copolymers. Also provided is a blown film that is produced from the polyester blend composition, and a process for producing the polyester blend composition and the film. The film is biodegradable, transparent, and has excellent mechanical properties.

20 Claims, No Drawings

POLYESTER BLEND COMPOSITIONS AND BIODEGRADABLE FILMS PRODUCED THEREFROM

This application claims the benefit of U.S. Provisional Application No. 60/380,341, filed May 13, 2002.

BACKGROUND OF THE INVENTION

The present invention relates to polyester blend compositions. More specifically, the invention relates to a polyester blend composition of two or more copolymers, particularly polyester blends of one or more branched biodegradable copolymers with one or more linear biodegradable copolymers, a biodegradable film formed from the blend composition, and a method for manufacturing the blend composition and film.

Prompted by societal concerns and demands concerning the disposal of plastic products such as plastic films, research is being done on biodegradable resin compositions. Active efforts are underway to develop biodegradable aromatic polyester resin compositions that are degradable under the high-humidity, high-temperature conditions associated with waste composting processes. Various uses are being proposed for such compositions. For example, U.S. Pat. No. 5,053,482 to Tietz, U.S. Pat. No. 5,097,004 to Gallagher et al., and U.S. Pat. No. 5,097,005 to Tietz describe polyesters prepared by polymerizing a glycol component made of ethylene glycol and diethylene glycol with two acid components; namely, an alkali metal or alkaline earth metal salt of a sulfonic acid, and terephthalic acid. These patents also describe fibers, films, sheets, and fiber nonwoven fabrics composed of such polyesters.

U.S. Pat. No. 5,443,780 to Matsumoto et al. and U.S. Pat. No. 5,076,983 to Loomis et al. describe biodegradable films and methods for their production, which films are biaxial films produced by melt-extruding a biodegradable polylactic acid polymer as a film and then orienting the extruded film. Such films have properties similar to those of films endowed with good strength and clarity, such as polypropylene film, oriented polystyrene film, and oriented polyethylene terephthalate film.

U.S. Pat. No. 5,076,983 to Loomis et al. discloses a film of improved properties, including strength, stiffness and clarity that is formed by extruding a polyhydroxy acid composition and stretching the extruded composition to produce a biaxially oriented film.

Films made of ordinary resins such as polyolefin resins, polyamide resins, polyester resins, and polyvinyl chloride resins are currently widely used today as packaging materials.

When films formed of degradable polymer are used as packaging materials and in related applications, the relevant film properties (e.g., mechanical strength, clarity, and gas barrier properties) generally fall somewhat short of the properties of resins that have hitherto been used in packaging materials, such as polyolefin resins, polyamide resins, polyester resins, and polyvinyl chloride resins.

As noted above, oriented films made of polylactic acid resins have sufficient strength and clarity. These films, however, lack sufficient stiffness, impact resistance, heat-sealability, and gas barrier properties for practical use.

Moreover, when a film is extruded using polylactic acid, and especially poly(L-lactic acid), the melting point is 170° C. Because the temperature difference between the glass transition temperature (about 60° C.) and the crystallization temperature (about 110° C.) is small, the allowable range of conditions for carrying out orientation is narrow. As a result, film composed of this type of resin is poorly suitable for orientation.

To overcome these shortcomings, International Publication Number WO01/10928 describes an oriented aromatic polyester film formed by an aromatic polyester copolymer consisting of repeating units derived from terephthalic acid, a metal salt of sulfonic acid, aliphatic dicarboxylic acid, ethylene glycol, and diethylene glycol, wherein the melting point and glass transition temperature of the film is controlled to provide enhanced performance properties, particularly sealing strength.

It is desirable to provide biodegradable compositions that have enhanced performance properties, such as softness and tear strength, and that are suitable for use in such applications as packaging materials.

All references cited herein are incorporated by reference.

SUMMARY OF THE INVENTION

The present invention provides a blend composition of polyesters useful for making a polyester film that is biodegradable, transparent, and heat-sealable and provides softness and tear strength properties adequate for formation of films using blowing processes.

The invention also includes a method for manufacturing blown aromatic polyester films that have a broad range of suitable blowing conditions.

Applicants have found that a blown aromatic polyester film having excellent mechanical properties such as softness and tear strength can be obtained by forming a film from a blend composition comprising at least two copolymers selected from aromatic copolymer polyester (a), polyester copolymer (b), branched polyester (c), and polyester copolymer (d) set forth below as useful in this invention. Applicants have found that preferably such blend compositions comprise at least one branched polyester copolymer and at least one linear polyester copolymer.

Other embodiments that Applicants have found preferable are blends consisting essentially of at least one of the aromatic copolymer polyesters (a), at least one of the polyester copolymers (b), and at least one of the branched polyesters (c), blends consisting essentially of at least one of the aromatic copolymer polyesters (a) and at least one of the branched polyesters (c), and blends consisting essentially of at least one of polyester copolymers (b) and at least one of the branched polyesters (c), blends comprising at least one of the aromatic copolymer polyesters (a), at least one of the polyester copolymers (b), at least one of the branched polyesters (c), and at least one of the polyester copolymers (d), blends comprising at least one of the aromatic copolymer polyesters (a), at least one of the branched polyesters (c), and at least one of the polyester copolymers (d), and blends comprising at least one of polyester copolymers (b), at least one of the branched polyesters (c), and at least one of the polyester copolymers (d), blends comprising polyester copolymer (d) that is branched with at least one polyester copolymer selected from aromatic copolymer polyester (a) and copolymer polyester (b), blends comprising branched polyester copolymer (c) with at least one polyester copolymer selected from aromatic polyester copolymer (a), polyester copolymer (b), and linear polyester copolymer (d), and blends comprising at least one aromatic polyester copolymer (a) and at least one copolymer polyester (b).

In one embodiment, the blend composition comprises at least 1 wt % of at least one of the branched copolymers (c) and (d) and less than 99 wt % of the copolymer (a). In another embodiment, the blend composition comprises at least 10 wt % of at least one of the branched copolymers (c) and (d) and less than 90 wt % of the copolymer (b). In yet another embodiment, the blend composition comprises at least 0.1 wt % of at least one of the linear copolymers (a), (b), and (d) and less than 99.9 wt % of the branched copolymer (c).

Copolymers useful in the present invention include:

aromatic polyester copolymer (a) having repeating units comprising an acid component and a glycol component; wherein the acid component comprises about 50 to 90 mol % terephthalic acid, about 0.2 to 6 mol % sulfonic acid metal salt, and about 9.8 to 49.8 mol %, aliphatic dicarboxylic acid or an ester-forming derivative of the aliphatic dicarboxylic acid; and wherein the glycol component comprises about 50 to 99.9 mol % ethylene glycol and about 0.1 to 50 mol % diethylene glycol;

polyester copolymer (b) prepared by copolymerization of the copolymer (a) with a poly(alkylene ether) glycol;

branched polyester copolymer (c) prepared by polycondensation of the copolymer (a) with a poly(alkylene ether) glycol; and polyester copolymer (d) having repeating units comprising an acid component and a glycol component; with the proviso that when the acid component comprises one or more aromatic dicarboxylic acids, the mol % of the one or more aromatic dicarboxylic acids of the polymer (d) is less than the mol % of the aromatic dicarboxylic acid content of the copolymers (a), (b), and (c). Up to about 5 mol % of a polyfunctional branching agent can be added to branch the copolymer (d).

In a preferred embodiment, the acid component of the copolymer (a) comprises 70 to 90 mol % terephthalic acid. In another preferred embodiment, the poly(alkylene ether) glycol of the copolymer (b) is 0.1 to 20 wt % of the copolymer (b). In yet another preferred embodiment, the poly(alkylene ether) glycol of the copolymer (c) is 0.1 to 20 wt % of the copolymer (c). In another preferred embodiment, the poly(alkylene ether) glycol is poly(ethylene) glycol.

The copolymer (d) is preferably an aliphatic polyester and, further, is preferably a biodegradable aliphatic-aromatic polyester.

The invention also includes a biodegradable film formed from the blend composition of the invention. Preferably, the film has a tear strength of at least 80 gf, a tensile elongation of at least 300%, or both.

The invention also includes a process for forming a blend composition, comprising blending at least two copolymers of the copolymers (a)-(d), particularly wherein at least one of the copolymers is branched and at least one is linear.

The invention also includes a process for producing a biodegradable film. The process comprises the steps of blending at least two copolymers selected from copolymers (a)-(d), particularly wherein at least one of the copolymers is branched and at least one is linear, and blow molding the blend composition to form a film.

The invention also includes a process for improving at least one of the wrinkling and the tear strength of a film made from the copolymer (a), the process comprising blending the copolymer (a) prior to forming the film with at least one copolymer selected from copolymers (b)-(d), preferably selected from branched copolymers (c)-(d).

DETAILED DESCRIPTION OF THE INVENTION

According to the present invention, there are provided blend compositions of at least two copolymers selected from copolymers (a)-(d) described herein, particularly wherein at least one of the copolymers is branched and at least one is linear. The blend compositions of the invention are useful for making films that are biodegradable, transparent, and heat-sealable by conventional sealing techniques such as impulse sealing, high-frequency sealing, and ultrasonic sealing. The films of the invention also have enhanced performance properties, in particular softness and tear strength, and are suitable for use in such applications as packaging materials.

Copolymer (a)

The aromatic polyester copolymer (a) has repeating units comprising an acid component and a glycol component. The acid component of the copolymer (a) comprises about 50 to 90 mol % terephthalic acid, about 0.2 to 6 mol % sulfonic acid metal salt, and about 9.8 to 49.8 mol % aliphatic dicarboxylic acid or an ester-forming derivative of the aliphatic dicarboxylic acid. The glycol component comprises about 50 to 99.9 mol % ethylene glycol and about 0.1 to 50 mol % diethylene glycol.

The acid component of the copolymer (a) preferably comprises 70 to 90 mol % terephthalic acid and 9.8 to 30 mol % aliphatic dicarboxylic acid. The acid component of the copolymer (a) more preferably comprises 75 to 90 mol % terephthalic acid and 9.8 to 25 mol % aliphatic dicarboxylic acid. The acid component of the copolymer (a) also preferably comprises 1 to 5 mol % sulfonic acid metal salt. Illustrative examples of the sulfonic acid metal salt include metal salts of 5-sulfoisophthalic acid, metal salts of 4-sulfoisophthalic acid, and metal salts of 4-sulfophthalic acid. Of these, metal salts of 5-sulfoisophthalic acid are preferred. Preferred examples of the metal ions include ions of alkali metals such as sodium, potassium, and lithium, or of alkaline earth metals such as magnesium. The most preferred sulfonic acid metal salt is the sodium salt of 5-sulfoisophthalic acid. Sulfonic acid metal salts are relatively expensive and, when used in excess, the sulfonic acid metal salt renders the polyester water-soluble and moreover affects physical characteristics such as film shrinkage. It has been discovered that the sulfonic acid metal salt significantly contributes to the degradability of the resulting film and, as such, the acid component of the copolymer (a) preferably comprises 1 to 5 mol % sulfonic acid metal salt. Preferably, the glass transition of the copolymer (a) will be above about 5° C.

Composting that involves the degradation of plastic film is typically carried out under high-temperature, high-humidity conditions. Because composting is generally done at a temperature of about 70° C. or less, the copolymer (a) preferably has a glass transition temperature ($T_g$) lower than about 70° C. and, more preferably, lower than about 65° C. In the invention, the acid component further comprises an aliphatic dicarboxylic acid that sets the glass transition temperature not higher than about 70° C. An ester-forming derivative of the dicarboxylic acid, such as dimethyl ester or diethylene ester, may be used in place of the dicarboxylic acid. The acid component comprises about 9.8 to 49.8 mol % aliphatic dicarboxylic acid or an ester-forming derivative of the aliphatic dicarboxylic acid. At less than 9.8 mol % aliphatic dicarboxylic acid, the glass transition temperature of the copolymer cannot be significantly lowered. On the other hand, an aliphatic dicarboxylic acid level in excess of 49.8 mol % invites a decline in the glass transition temperature, causing a loss of suitable stiffness in the film. In a preferred embodiment, the acid component of the copolymer (a) comprises 9.8 to 30 mol % aliphatic dicarboxylic acid or ester-forming derivative of the aliphatic dicarboxylic acid. In a more preferred embodiment, the acid component of copolymer (a) comprises 9.8 to 25 mol % aliphatic dicarboxylic acid or ester-forming derivative of the aliphatic dicarboxylic acid. The aliphatic dicarboxylic acid preferably has 2 to 18 carbons, and more preferably 2 to 10 carbons. Illustrative examples of the aliphatic dicarboxylic acid include azelaic acid, succinic acid, adipic acid, sebacic acid, and glutaric acid. Of these, glutaric acid is preferred.

The glycol component preferably comprises about 80 to 98 mol % ethylene glycol and about 2 to 20 mol % diethylene glycol. When the glycol component comprises a mol % diethylene glycol that is significantly greater than 20 mol %, such as 50 mol %, the resulting film suffers from having poor mechanical properties, such as poor tensile strength. When the glycol component comprises a mol % diethylene glycol that is significantly less than 2 mol %, such as 0.1 mol %, the resulting film suffers from having poor biodegradability.

Substituting up to 20 mol % of the ethylene glycol with another glycol such as triethylene glycol may further lower the glass transition temperature of the copolymer. A balanced range of properties, especially mechanical properties and biodegradability, can be achieved by preparing the film of the present invention by choosing selected amounts of respective components within the above mol % ranges. If it is desired to enhance the mechanical properties of the film, the amount of terephthalic acid is increased, and if it is desired to enhance biodegradability, the amount of aliphatic dicarboxylic acid is increased, resulting in a lower glass transition temperature ($T_g$).

Copolymer (b)

The copolymer (b) of the invention is prepared by copolymerization of the copolymer (a) with a poly(alkylene ether) glycol. The poly(alkylene ether) glycol component of the copolymer (b) is about 0.1 to 20 wt %. In a preferred embodiment, the poly(alkylene ether) glycol is poly(ethylene glycol). Another preferred poly(alkylene ether) glycol is poly(propylene glycol). Preferably, the glass transition of the copolymer (a) will be above about 5° C.

Copolymer (c)

The copolymer (c) of the invention is prepared by polycondensation of the copolymer (a) with a branching agent and, optionally, a poly(alkylene ether) glycol. Minor amounts of polyfunctional branching agents, such as trimellitic acid, are incorporated to branch the copolymer (c) to modify melt rheology and film processing. The poly(alkylene ether) glycol component of the copolymer (c) is about 0 to 20 wt %. A preferred poly(alkylene ether) glycol is poly(ethylene glycol). Another preferred poly(alkylene ether) glycol is poly(propylene glycol). Preferably, the glass transition of the copolymer (a) will be above about 5 degrees C.

Copolymer (d)

The copolymer (d) of the invention has repeating units comprising an acid component and a glycol component. When the acid component of the copolymer (d) includes one or more aromatic dicarboxylic acids, the mol% of the one or more aromatic dicarboxylic acids must be less than the mol% of the aromatic dicarboxylic acid content of the copolymers (a), (b), and/or (c). Preferably, the acid component of the copolymer (d) is 0 to 65 mol% terephthallc acid and 0 to 5 mol% sulfonic acid metal salt. Up to about 5 mol% of a polyfunctional branching agent can be added to branch the copolymer (d). The copolymer (d) can be, for example, polybutylene succinate, polylactide, polycaprolactone, or polybutyl succinate adipate.

The copolymers used to form the films of the invention can be prepared by any well-known polymerization method. For example, a straight-chain (linear) polyester in which the monomer units are randomly distributed along the molecular chain can be prepared by charging a polymerizer with the monomer constituents together with antimony or some other catalyst, and carrying out polycondensation under suitable polycondensation conditions. Another method that may be used involves initially reacting two or more of the monomer constituents to prepare a prepolymer, then adding the remaining monomer constituents and polymerizing. The copolymers used to form the blend compositions of the invention typically have an intrinsic viscosity within a range of 0.1 to 1.5 dL/g, preferably 0.3 to 1.2 dL/g.

The blend composition of the invention can be formed by blending at least two of copolymers (a)-(d), particularly wherein at least one of the copolymers is branched and at least one is linear. The blending of at least two of copolymers (a)-(d) can be performed using conventional techniques well known to those skilled in the art, such as dry blending the copolymers. In one embodiment, the copolymers are dry blended and dried sufficiently before charging into the machine hopper for blowing.

In one embodiment, the blend composition comprises at least 1 wt % of at least one of said copolymers (b), (c), and (d) and less than 99 wt % of said copolymer (a). In another, it comprises at least 10 wt % of at least one of said copolymers (a), (c), and (d) and less than 90 wt % of said copolymer (b). In another, it comprises at least 0.1 wt % of at least one of said copolymers (a), (b), and (d) and less than 99.9 wt % of said copolymer (c).

In one embodiment, the blend composition of the invention comprises at least 1 wt % of at least one of the branched copolymers (c)-(d) and less than 99 wt % of the copolymer (a). A blown film formed from the copolymer (a) alone suffers from wrinkling and poor tear strength. It has been discovered that blending the copolymer (a) with at least 1 wt % of copolymers (b), (c) and/or (d), preferably with the branched copolymers (c) and/or (d), will reduce wrinkling and improve the tear strength of the film.

In another embodiment, the blend composition comprises at least 10 wt % of at least one of the copolymers (a), (c) and (d), preferably at least one of the branched copolymers (c) and (d) and less than 90 wt % of the copolymer (b). A blown film formed from the copolymer (b) alone suffers from unstable blowing properties and poor tear strength. It has been discovered that blending the copolymer (b) with at least 10 wt % of at least one of the copolymers (a), (c) and (d), preferably at least one of the branched copolymers (c) and (d), will improve the blowing properties and tear strength of the film.

In yet another embodiment, the blend composition comprises at least 0.1 wt % of at least one of the copolymers (a), (b), and (d) and less than 99.9 wt % of the copolymer (c). A blown film formed from the copolymer (c) alone suffers from blocking of the blown film. It has been discovered that blending the copolymer (c) with at least 0.1 wt % of at least one of the copolymers (a), (b), and (d) reduces film blocking and improves the tear strength and elongation of the film.

Films made from the blend compositions of the invention are biodegradable and decompose under the high-humidity, high-temperature conditions typical of composting. Most of the monomer and oligomer (i.e., terephthalic acid, glycol, and oligomers thereof) that form as a result of such degradation are readily digested by microorganisms in the solid wastes or compost, ultimately becoming carbon dioxide and water.

Conventional additives such as plasticizers, lubricants, toughening agents, inorganic fillers, nucleating agents, anti-electrification agents, antioxidants, and weathering stabilizers may be added to the foregoing copolymers and blend compositions for the purpose of adjusting the film formability or mechanical properties.

The blend composition described herein can also be produced as cast film. A conventional coating or covering method can be applied to the film. For example, a metal, inorganic oxide, or polyvinyl alcohol can be added as a coat to achieve enhanced gas barrier properties. As another example, a silicone coating can be applied as a lubricant. As yet another example, an acrylic polymer can be used to improve heat sealability at lower temperatures.

The blown film of the invention is well-suited for use in a range of applications, including agricultural and horticultural supplies such as mulch film for farming and gardening use, seed tape, pesticide bags, and composting waste bags; household supplies such as bags for kitchen scraps, water drainage bags, shopping bags, paper cups, and paper dishes; business supplies such as coated paper for recycling paper products, printed laminates, card covers, window envelopes, and cover film for printed paper; hygienic supplies such as paper diaper backing sheets, sanitary napkins, disposable gloves, and laundry bags; and general packaging applications such as bottles, shrink films for various uses, food packaging films, and wrapping films.

Further in accordance with the present invention, there is provided a process for manufacturing a biodegradable film. The process comprises blending at least two of the copolymers (a)-(d) of the invention, particularly wherein at least one of the copolymers is branched and at least one is linear, to form a blend composition, and blow molding the blend composition to form the film. The step of blow molding the blend composition can be performed using conventional methods well known in the art.

In one embodiment, the process of forming the blown film involves feeding a blend composition of the invention in the form of flakes to an extruder, melting the flakes, extruding the melt through an annular die, and blowing the extruded material to form a tube. An air stream located above or below the die cools the tube and then transporting the tube through a frame and nip rolls collapses the tube to form a blown film having a thickness within a range of about 5 μm to 150 μm.

After blowing, the film dimensions may be stabilized by administering a heat treatment, e.g., a heat setting. The administration of a heat treatment is particularly useful when it is desirable to obtain a blown film having good heat sealability.

EXAMPLES

The examples below are given by way of illustration only and are not intended to limit the scope of the invention.

The methods of measurement and evaluation used in the examples are described below.

Blown film formability: Good blown film formability means that no film wrinkling was observed, and the film remained stable during blowing process. Poor blow film formability means that film wrinkling was observed and the film lacked stable blowing.

Modulus: Measured in accordance with JIS K7127.

Stress at Break: Measured in accordance with JIS K7127.

Elongation at Break: Measured in accordance with JIS K7127.

Compost Degradability: The compost was comprised of pig dung and rice husk and had a pH of about 8, a temperature of about 50° C., and a water content of about 50%. Test pieces of about 10 cm×10 cm were placed in the compost for 3 weeks, after which the specimens were then visually examined. The observation "YES" indicated that the shape readily broke down under outside forces. The observation "NO" indicated that no change occurred.

In the examples, the example copolymer (a) was an aromatic polyester copolymer (density, 1.35 g/cm$^3$; melting point, 200° C.; melt index at 220° C. under 2,160 g of loading, 11 g/10 min) having repeating units composed of an acid component and a glycol component. The acid component was 80 mol % dimethyl terephthalate; 2 mol % 5-sulfoisophthalic acid, sodium salt; and 18 mol % dimethyl glutarate. The glycol component was 96 mol % ethylene glycol and 2-3 mol % diethylene glycol.

The example copolymer (b) was an aromatic polyester copolymer (density, 1.35 g/cm$^3$; melting point, 200° C.; melt index at 220° C. under 2,160 g of loading, 28 g/10 min) prepared by copolymerizing the example copolymer (a) with 8 wt % poly(ethylene) glycol. The acid component was 80 mol % dimethyl terephthalate; 2 mol % 5-sulfoisophthalic acid, sodium salt; and 16 wt % dimethyl glutarate. The glycol component was 95 mol % ethylene glycol; 2-3 mol % diethylene glycol; and 8 wt % poly(ethylene) glycol.

The example copolymer (c) was a branched aromatic polyester copolymer (density, 1.35 g/cm$^3$; melting point, 185° C.; melt index at 220° C. under 2,160 g of loading, 23 g/10 min) prepared by copolymerizing the example copolymer (a) with 8 wt % poly(ethylene) glycol. The acid component was 80 mol % dimethyl terephthalate; 2 mol % 5-sulfoisophthalic acid, sodium salt; and 16 wt % dimethyl glutarate. The glycol component was 96 mol % ethylene glycol; 4 mol % diethylene glycol; and 8 wt % poly(ethylene) glycol. The example copolymer (c) also contained 7000 ppm of 65 wt % solids ethylene glycol solution of tris(2-hydroxyethyl)trimellitate.

The example copolymer (d) was polybutyl succinate.

Example 1

Blend of Copolymers (a) and (c)

Flakes (small particles) of the example copolymer (a) and example copolymer (c) were dry blended at a wt % ratio of 67/33 and were pre-dried in an oven, then melted in a 200 mm diameter extruder at a cylinder temperature setting of 190° C. to 210° C. The melt was blown up from the die and the bubble was cooled in air for 4 minutes, giving a blown film having a thickness of 25 micron. Evaluations and measurements were carried out on the resulting film. The results are shown in Table 1.

Example 2

Blend of Copolymers (a)-(c)

Flakes (small particles) of the example copolymers (a)-(c) were dry blended at a wt % ratio of 53/20/27 and were pre-dried in an oven, then melted in a 200 mm diameter extruder at a cylinder temperature setting of 190° C. to 210° C. The melt was blown up from the die and the bubble was cooled in air for 4 minutes, giving a blown film having a thickness of 25 micron. Evaluations and measurements were carried out on the resulting film. The results are shown in Table 1.

Example 3

Blend of Copolymers (b) and (c)

Flakes (small particles) of the example copolymers (b) and (c) were dry blended at a wt % ratio of 20/80 and were pre-dried in an oven, then melted in a 200 mm diameter extruder at a cylinder temperature setting of 190° C. to 210° C. The melt was blown up from the die and the bubble was cooled in air for 4 minutes, giving a blown film having a thickness of 34 micron. Evaluations and measurements were carried out on the resulting film. The results are shown in Table 1.

Example 4

Blend of Copolymers (a)-(d)

Flakes (small particles) of the dry blend from Example 2 (blend of copolymers (a)-(c)) and the example copolymer (d) were dry blended at a wt % ratio of 91/9 and were pre-dried in an oven, then melted in a 200 mm diameter extruder at a cylinder temperature setting of 190° C. to 210° C. The melt was blown up from the die and the bubble was cooled in air for 4 minutes, giving a blown film having a thickness of 40 micron. Evaluations and measurements were carried out on the resulting film. The results are shown in Table 1.

Comparative Example 1

Copolymer (a) Alone

Flakes (small particles) of the example copolymer (a) were pre-dried in an oven, then melted in a 200 mm diameter extruder at a cylinder temperature setting of 200° C. to 220° C. The melt was blown up from the die and the bubble was cooled in air for 4 minutes, giving a blown film having a thickness of 25 micron. Evaluations and measurements were carried out on the resulting film. The results are shown in Table 1.

Comparative Example 2

Copolymer (b) Alone

Flakes (small particles) of the example copolymer (b) were pre-dried in an oven, then melted in a 200 mm diameter extruder at a cylinder temperature setting of 200° C. to 220° C. An attempt was made to blow the melt from the die, but the melt had unstable blowing properties (the bubble easily beaked) and a film could not be produced.

Comparative Example 3

Copolymer (c) Alone

Flakes (small particles) of the example copolymer (c) were pre-dried in an oven, then melted in a 200 mm diameter extruder at a cylinder temperature setting of 200° C. to 220° C. An attempt was made to blow the melt from the die, but the produced film roll blocked and the film could not be removed from the roll.

The results in Table 1 demonstrate that each of the blend films made from Examples 1-4 had improved blow film formability compared to Comparative Example 1, and that the Example 2 blend film had improved tensile strength over the Comparative Example 1 film. Furthermore, the Example 3 and 4 blend films had significantly improved elongation and tear strength over the Comparative Example 1 film.

TABLE 1

| | Example 1 | Example 2 | Example 3 | Example 4 | Comp. Ex. 1 |
|---|---|---|---|---|---|
| blend composition | (a)/(c) = 67/33 | (a)/(b)/(c) = 53/20/27 | (b)/(c) = 20/80 | (a) + (b) + (c)/ (d) = 91/9 | (a) |
| blow film formability | good | good | good | good | poor |
| thickness (micron) | 25 | 31 | 34 | 40 | 25 |
| tensile strength at break (kgf/mm$^2$) (traverse direction/ machine direction) | 3.0/3.4 | 4.2/4.2 | 3.0/2.8 | 2.8/3.2 | 3.4/3.3 |
| tensile elongation (%) (traverse | 3.8/2.8 | 4.8/4.7 | 456/562 | 417/557 | 2.3/2.8 |

TABLE 1-continued

Physical Properties of the Films

|  | Example 1 | Example 2 | Example 3 | Example 4 | Comp. Ex. 1 |
|---|---|---|---|---|---|
| direction/machine direction) tensile modulus (kgf/mm²) (traverse direction/machine direction) | 107/140 | 119/116 | 34/37 | 19/21 | 137/127 |
| Tear strength (gf) (traverse direction/machine direction) | 100/113 | 128/83 | 245/264 | 235/299 | 76/81 |
| Compost degradability | YES | YES | YES | YES | YES |

What is claimed is:

1. A polyester blend composition comprising at least one branched biodegradable copolymer and at least one linear biodegradable copolymer wherein at least one of the linear biodegradable copolymers is selected from the group consisting of:

an aromatic polyester copolymer (a) having repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol; and a polyester copolymer (b) prepared by copolymerization of said copolymer (a) with a poly(alkylene ether) glycol; and wherein at least one of the branched biodegradable copolymers is a branched polyester copolymer (c), and wherein said branched polyester copolymer (c) is prepared by polycondensation of said copolymer (a) with a poly(alkylene ether) glycol.

2. A polyester blend composition of comprising at least one branched biodegradable copolymer and at least one linear biodegradable copolymer wherein at least one of the linear copolymers comprises:

an aromatic polyester copolymer consisting essentially of repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol;

wherein at least one of the branched copolymers is a branched polyester copolymer, and wherein said branched polyester copolymer is prepared by polycondensation of said aromatic polyester copolymer with a poly(alkylene ether) glycol.

3. A polyester blend composition comprising at least one branched aromatic biodegradable copolymer and at least one linear aromatic biodegradable copolymer, wherein at least one of the linear copolymers is selected from the group consisting of:

an aromatic polyester copolymer (a) having repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol; and a polyester copolymer (b) prepared by copolymerization of said copolymer (a) with a poly(alkylene ether) glycol; and wherein at least one of the branched copolymers is said branched polyester copolymer (c), and wherein said branched polyester copolymer (c) is prepared by polycondensation of said copolymer (a) with a poly(alkylene ether) glycol.

4. A polyester blend composition comprising at least one branched aromatic biodegradable copolymer and at least one linear aromatic biodegradable copolymer, wherein at least one of the linear copolymers is selected from the group consisting of:

an aromatic polyester copolymer (a) consisting essentially of repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol; and a polyester copolymer (b) prepared by copolymerization of said copolymer (a) with a poly(alkylene ether) glycol; and wherein at least one of the branched copolymers consists of:

a branched polyester copolymer (c) prepared by polycondensation of said copolymer (a) with a poly(alkylene ether) glycol.

5. A polyester blend composition consisting essentially of at least one linear copolymer selected from the group consisting of:

an aromatic polyester copolymer (a) having repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol; and a polyester copolymer (b) prepared by copolymerization of said copolymer (a) with a poly(alkylene ether) glycol; and a branched polyester copolymer (c) prepared by polycondensation of said copolymer (a) with a poly(alkylene ether) glycol.

6. A polyester blend composition comprising at least two copolymers selected from the group consisting of:

an aromatic polyester copolymer (a) consisting essentially of repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol;

a polyester copolymer (b) prepared by copolymerization of said copolymer (a) with a poly(alkylene ether) glycol; and a branched polyester copolymer (c) prepared by polycondensation of said copolymer (a) with a poly(alkylene ether) glycol.

7. The blend composition of claim 6 that comprises at least 1 wt % of at least one of said copolymers (b) and (c), and less than 99 wt % of said copolymer (a).

8. The blend composition of claim 6 that comprises at least 10 wt % of at least one of said copolymers (a) and (c), and less than 90 wt % of said copolymer (b).

9. The blend composition of claim 6 that comprises at least 0.1 wt % of at least one of said copolymers (a) and (b), and less than 99.9 wt % of said copolymer (c).

10. The blend composition of any of claims 1, or, wherein the acid component of said copolymer (a) is 70 to 90 mol % of copolymerized terephthalic acid.

11. The blend composition of any of claims 1, or, wherein the copolymerized poly(alkylene ether) glycol of said copolymer (b) is 0.1 to 20 wt % of said copolymer (b).

12. The blend composition of any of claims 1, 3, or 4, wherein the polycondensed poly(alkylene ether) glycol of said copolymer (c) is 0.1 to 20 wt % of said copolymer (c).

13. The blend composition of any of claims 1, or, wherein said copolymerized poly(alkylene ether) glycol, said polycondensed poly(alkylene ether) glycol, or said copolymerized and said polycondensed poly(alkylene ether) glycols are poly(ethylene glycol).

14. A biodegradable film formed from the blend composition of any of claims 1, 5, 6, or 2.

15. The film of claim 14, wherein the film has a tear strength of at least 80 gf.

16. The film of claim 14, wherein the film has a tensile elongation of at least 300%.

17. A process for forming a biodegradable blend composition having softness and tear strength properties adequate for formation of films using blowing processes comprising blending at least two copolymers selected from the group consisting of:

an aromatic polyester copolymer (a) consisting essentially of repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol;

a polyester copolymer (b) prepared by copolymerization of said copolymer (a) with a poly(alkylene ether) glycol; and a branched polyester copolymer (c) prepared by polycondensation of said copolymer (a) with a poly(alkylene ether) glycol.

18. A process for producing a biodegradable film, comprising:

blending at least one branched biodegradable polyester copolymer and at least one linear biodegradable polyester copolymer and then blow-molding the resulting blend to form said film, wherein at least one of the linear copolymers is selected from the group consisting of:

an aromatic polyester copolymer (a) having repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol; and a polyester copolymer (b) prepared by copolymerization of said copolymer (a) with a poly(alkylene ether) glycol;

wherein at least one of the branched copolymers is a branched polyester copolymer (c) prepared by polycondensation of said copolymer (a) with a poly(alkylene ether) glycol.

19. A process for improving at least one of the wrinkling and the tear strength of a film made from an aromatic polyester copolymer (a) consisting essentially of repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol, said process comprising blending said copolymer (a) prior to forming said film with at least one copolymer selected from the group consisting of:
  a polyester copolymer (b) prepared by copolymerization of said copolymer (a) with a poly(alkylene ether) glycol; and
  a branched polyester copolymer (c) prepared by polycondensation of said copolymer (a) with a poly(alkylene ether) glycol.

20. A process for improving at least one of the wrinkling and the tear strength of a film made from an aromatic polyester copolymer (a) consisting essentially of repeating units comprising an acid component and a glycol component; wherein the acid component comprises about 50 to 90 mol % of copolymerized terephthalic acid, about 0.2 to 6 mol % of copolymerized sulfonic acid metal salt, and about 9.8 to 49.8 mol % of copolymerized aliphatic dicarboxylic acid or a copolymerized ester-forming derivative of the aliphatic dicarboxylic acid; and wherein the glycol component comprises about 50 to 99.9 mol % of copolymerized ethylene glycol and about 0.1 to 50 mol % of copolymerized diethylene glycol, said process comprising blending said copolymer (a) prior to forming said film with at least one copolymer consisting of:
  a branched polyester copolymer (c) prepared by polycondensation of said copolymer (a) with a poly(alkylene ether) glycol.

* * * * *